Figures 1, 2:
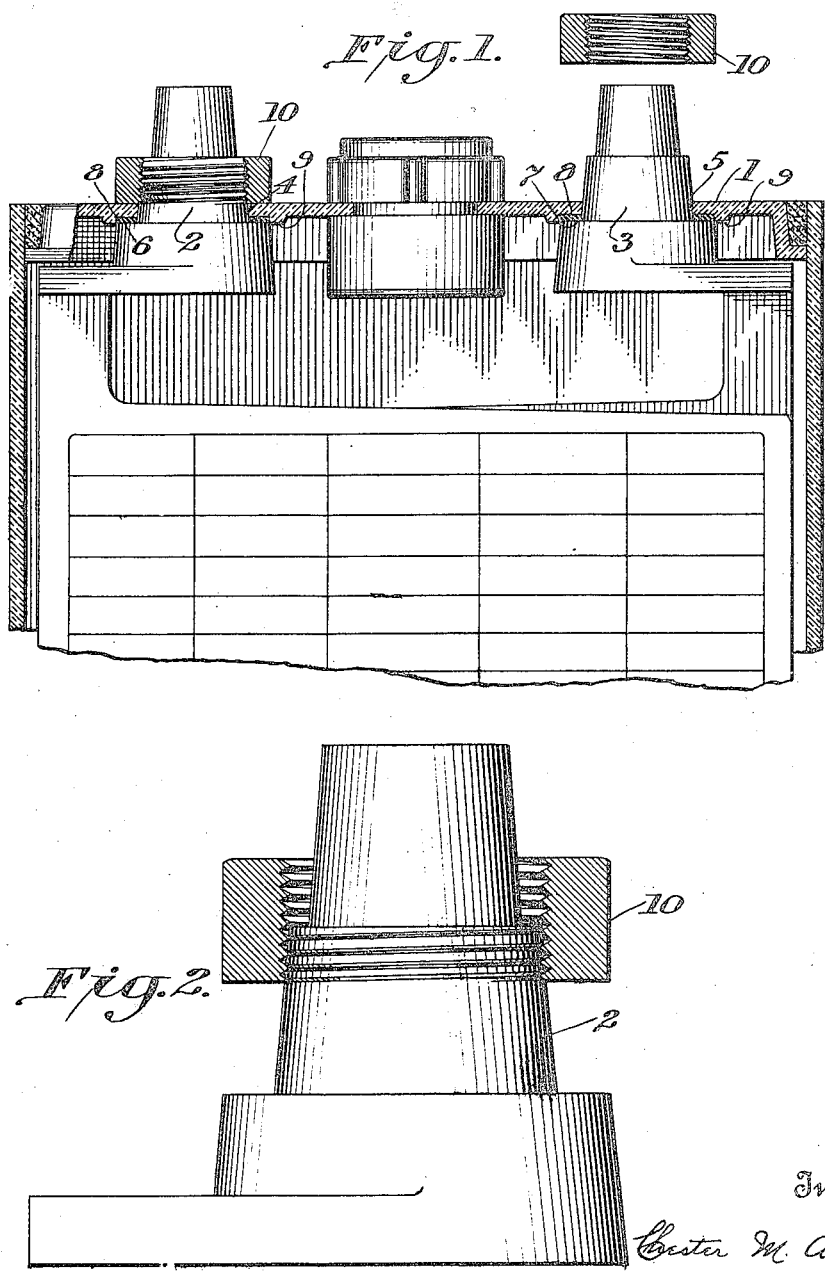

C. M. ANGELL.
BATTERY SEAL.
APPLICATION FILED NOV. 12, 1918.

1,298,856.

Patented Apr. 1, 1919.

Inventor:
Lester M. Angell,
By Byrnes, Townsend & Brickenstein,
Attorneys.

UNITED STATES PATENT OFFICE.

CHESTER M. ANGELL, OF CHICAGO, ILLINOIS, ASSIGNOR TO VESTA ACCUMULATOR COMPANY, OF CHICAGO, ILLINOIS, A CORPORATION OF ILLINOIS.

BATTERY-SEAL.

1,298,856.     Specification of Letters Patent.     Patented Apr. 1, 1919.

Application filed November 12, 1918. Serial No. 262,120.

*To all whom it may concern:*

Be it known that I, CHESTER M. ANGELL, a citizen of the United States, residing at Chicago, in the county of Cook and State of Illinois, have invented certain new and useful Improvements in Battery-Seals, of which the following is a specification.

The present invention relates to storage batteries and more particularly to the sealing of the terminal post to the cell cover.

It has heretofore been proposed to make a seal of this kind by the use of a soft rubber gasket, confined between a flange on the post and the cover, and a nut screwed down upon a screw threaded post against the upper surface of the cover. Such a construction has the disadvantage that, unless the thread on the post and the nut is of special design, the alloy nut and post will freeze together.

It is an object of the invention to provide a seal of the kind referred to which is exceedingly simple in construction and operation and effective.

It is a more particular object to provide a seal of the kind referred to in which the nut does not freeze on to the post.

In its broader aspect the invention consists in the use of an acid-resisting, non-freezing nut. In its more limited scope it consists of an acid-resisting, non-freezing nut of sufficient hardness to cut its own thread upon the post. Such nut may be made of any hard acid-resisting alloy, such as ship-nail metal, which is an alloy of lead, antimony and tin.

For a further description of the invention reference is had to the appended drawings in which:

Figure 1 is a vertical section through a battery showing at the left hand side a seal made in accordance with the invention and at the right hand side the relation of the parts before the nut is applied; and Fig. 2 is a fragmentary sectional view on an enlarged scale showing the nut partly screwed up on the terminal post.

In the drawing, 1 is the cell cover of hard rubber, and 2 and 3 are metal terminal posts extending through openings 4 and 5 respectively of the cover. The posts 2 and 3 have shoulders 6 and 7 to form seats for the cover plate. Intermediate these shoulders and the cover plate are placed gaskets 8 of soft rubber or other suitable packing material and the cover plate 1 is provided with depending flanges 9 forming walls around the gaskets. The purpose of these flanges 9 is to so confine the gaskets between the cover plate 1 and the shoulders 6 and 7 respectively that they cannot be squeezed out of their normal position when the cover plate is pressed against the shoulders to insure tightness.

Above the cover plate the posts are slightly tapered and originally unthreaded. The nut 10 is preferably made of "ship-nail alloy," (lead, antimony and tin), and as it is screwed upon the post, cuts its own thread, first shallow and then deeper and finally to the full depth as it approaches its final position in contact with the plate 1. A nut, such as described, combines various advantages. It does not corrode and does not freeze on to the post. It is hard enough to cut its own thread on the terminal posts and thereby obviates the necessity of forming a thread on the posts. The thread on the nut may have any usual pitch, no special inclination of thread being needed. The seal thus provided is exceedingly simple in point of structure and operation and at the same time effective.

The nut can be taken off at will without injuring the terminal post. Even if the post should be mutilated in some way, the connection may be remade, because the metal of the post is softer than that of the nut and yields easily to the threads of the nut.

In the claims the term "non-freezing" is intended to define a nut of material which does not under the pressure and pressure reaction existing between the post and the nut form an adhesive union with or freeze on to the post, as it is commonly called.

I claim:

1. A battery seal between the cover plate and a terminal post extending therethrough, comprising a shoulder on the post, a packing between the said shoulder and the lower surface of the cover plate and a nut of acid-resisting, non-freezing metal screwed onto the post above the cover plate.

2. A battery seal between the cover plate and a terminal post extending therethrough, comprising a shoulder on the post, a packing between the said shoulder and the lower surface of the cover plate and a nut of acid-resisting, non-freezing metal screwed onto the post above the cover plate, said nut being of harder metal than the post and capable of cutting a thread on the post.

In testimony whereof, I affix my signature.

CHESTER M. ANGELL.